United States Patent [19]

Pirovano et al.

[11] 4,226,663
[45] Oct. 7, 1980

[54] APPARATUS FOR ASSOCIATING A BEAD FILLER WITH A BEAD CORE OF A VEHICLE TIRE

[75] Inventors: Dante Pirovano; Cesare Migliarini, both of Milan, Italy

[73] Assignee: Industrie Pirelli, S.p.A., Milan, Italy

[21] Appl. No.: 959,338

[22] Filed: Nov. 9, 1978

[30] Foreign Application Priority Data

Dec. 15, 1977 [IT] Italy .................. 30179 A/77

[51] Int. Cl.² .................................. B29H 17/32
[52] U.S. Cl. ..................... 156/422; 156/460; 156/502
[58] Field of Search ............ 156/136, 157, 304, 421, 156/422, 460, 502, 503

[56] References Cited

U.S. PATENT DOCUMENTS

| | | | |
|---|---|---|---|
| 2,565,703 | 8/1951 | Strong | 156/503 |
| 2,647,555 | 8/1953 | Hinman | 156/503 |
| 3,117,049 | 1/1964 | Otstot et al. | 156/503 |
| 3,787,263 | 1/1974 | Yonekawa et al. | 156/136 |
| 3,909,338 | 9/1975 | Leblond et al. | 156/422 |
| 3,962,020 | 6/1976 | Yonekawa et al. | 156/460 |
| 4,054,475 | 10/1977 | Bottasso et al. | 156/157 |
| 4,087,298 | 5/1978 | Mangun et al. | 156/136 |

*Primary Examiner*—John E. Kittle
*Attorney, Agent, or Firm*—Stevens, Davis, Miller & Mosher

[57] ABSTRACT

An apparatus for associating an elastomeric filler with a bead core of a vehicle tire has a fixed frame and two discs which contact each other and rotate together. Each disc has an annular groove with one for encasing the core and the other for applying the base of the filler to the core. The apparatus has means for blocking the opposite sides of the filler in proximity of each end of the "V" and for butt-splicing the ends of the filler strip.

15 Claims, 5 Drawing Figures

APPARATUS FOR ASSOCIATING A BEAD FILLER WITH A BEAD CORE OF A VEHICLE TIRE

This invention relates to an apparatus for installing elastomeric bead filler in the core of a tire bead and in particular it relates to an apparatus for assembling with a bead core in a continuous and automatic manner, on the outer surface of a rotating bead core, a part of a continuous strip of uncured elastomeric material which is cut into a plurality of sections with a cut orthogonal to the strip advancement direction and having a length equal to the peripheral layout of the outer surface of the core.

As is known, in building up pneumatic tires, a filler of elastomeric material, having in general a triangular shape and possessing chemical and physical properties different from those of the compound constituting the tire sidewalls and beads, is arranged in proximity of the bead and all around the bead core.

Usually, the filler is made of an elastomeric compound having a hardness greater than that of the compound used for the sidewalls of the tire. The filler carries out the double function of filling the outer zone of the bead core so as to prevent the occurrence of air pockets in the turn-up of the layers of carcass cords about the core and of imparting rigidity to the bead.

A system of arranging a strip of elastomeric material about a core encased in an appropriate cylindrical seat is also known. In this case, the strip is at first cut with equal longitudinal lower and upper edges. Then the cut strip is positioned by hand on a suitable annular supporting surface which is coaxial to the cylindrical seat of the core.

In a further step the operator bends manually the strip in such a way that the lower edge of the latter adheres to the core, and exerts opposite tension forces on the two facing ends because, as the upper edge has the same length as the lower edge and is situated on a circumferential line of greater radius, the two facing ends are opened with respect to each other.

Unfortunately, in that case, manual tension forces are applied on the two ends of the filler, and this may have, as a disadvantageous result, an irregular and ineffective joining of the ends of the strip because, for instance, of lack of elastomeric material in the two ends of the filler brought in butt-splice compression.

This condition is particularly objectional because what appears to be a regular joint in subsequent process steps may instead conceal a defect with consequences which appear later on, either during the further manufacturing steps or even worse, when the tire is fitted and travelling on a vehicle wheel.

It might appear that this drawback could be overcome by adopting a filler having a variable length from its base towards its top, namely the substantial shape of an isosceles trapezium whose smaller base has a length corresponding to the outer surface of the core and whose greater base corresponds to the length of the circumferential line, the radius of which results from the sum of the core radius with the filler height.

In this case the two ends of the filler wound up about the core result from a merely theoretical standpoint exactly arranged side-by-side and in mutual contact. However, such a procedure unfortunately has the drawback of often providing an inadequate point between the two ends of the filler.

In practice, this negative result depends on the fact that the perfect correspondence between the two ends of the filler leads the operator to impart only a slight tension on the ends; therefore, since good compression is not obtained between the uncured elastomeric material of both ends, the resulting joint is not quite reliable.

Consequently, also the above cited second solution to the problem tends to originate the inconvenience ascertained in the first solution to the problem.

On the other hand, it is evident that the above-mentioned working systems involve a further disadvantage of an economical nature, because these systems are all based on the employment of labor carrying out the operations of loading the core, applying the filler on the core and discharging the obtained final product.

An object of the present invention is to provide an automatic device for applying an elastomeric filler to a bead core, the length of the upper and lower edges of the filler being equal and corresponding to the outer layout of the core, and the loading of the filler on the core being automatic, without giving rise of any of the above indicated disadvantages.

Other objects will become apparent from the following description with reference to the accompanying drawing in which.

The foregoing objects and others are accomplished in accordance with the invention by providing an automatic device for the continuous assembly of an elastomeric filler with a bead wire to form a bead core of a pneumatic tire for a motor vehicle. Each filler has a base and an upper part of pre-established shape. The filler has a length about equal to the outermost peripheral layout of the core. The device provided by the invention comprises a fixed frame to which are associated two discs, in mutual contact along their periphery in order to rotate simultaneously, the first disc comprising a first annular groove to encase the core, the second disc comprising a second annular groove into which the upper part of the filler slides in tangential direction, the second annular groove being adapted to apply the base of the filler on the core rotating with the first disc as long as the filler base covers the outermost peripheral layout of the core and the two facing ends of the upper part of the filler are opened, radially to the first disc and towards the outside, in the form of a "V", the device, for applying a filler on a bead core, comprises means for blocking the opposite sides of the filler in the zones in proximity of each end of the "V" and means for butt-splicing the two opposite ends of the "V", the blocking means comprising two pairs of two pressure elements, each pair acting on opposite sides of the filler, and two relative mechanisms for applying opposite thrusts in each pair, the two pressure elements being arranged symmetrically to each other with respect to the center plane of the device, and at a distance from the filler when the first disc is rotating, the means for butt-splicing the two opposite V-shaped ends of the filler comprising a third mechanism for applying thrusts, opposite to one another, on the two pairs of pressure elements which, by means of the first two mechanisms, block the opposite sides of the filler.

Preferably, the device is characterized in that it comprises adjusting and centering means between the "V" of the filler on the first disc and the blocking and connecting means, the means comprising a body of geometrical form having at least two lateral faces forming a 'V' corresponding to that formed by the facing ends of the filler on the first disc and a lever having one end connected to the body and the other end hinged to the frame, the plane of symmetry of the two lateral faces of the body being coincident with the central symmetry plane between the pairs of pressure elements, the body being actuated by a suitable control unit when the first disc with the filler is in a rest position.

In a preferred embodiment of the device of the invention, each pair of the pressure elements of the blocking means comprises two arms, having parts which exert pressure on the elastomeric material of the filler and ends respectively associated with first and second sprocket wheels meshing together and symmetrical with respect to the center plane of the filler, one of the sprocket wheels comprising a revolving shaft connected with a ledger associated to the piston of an appropriate fluid-dynamic cylinder forming part of the mechanism for imparting thrusts opposite to one another in a pour of two arms, the fluid-dynamic cylinder being externally connected to the third mechanism of the connecting means for applying thrusts opposite to one another in the two pairs of arms acting on the opposite sides of the filler.

In this embodiment, the device is characterized in that each pair of the pressure elements, with the relative sprocket wheels, the piston and the fluid-dynamic cylinder, is integral with a support secured to the first end of a suitable lever having its second end fastened to a pivot whose axis of rotation is parallel to the axis of the first disc. The pivot represents the common axis of rotation of said two levers to which are associated the two supports with the two pairs of pressure elements, the pivot being moreover secured to the first frame, the two supports are subjected to thrusts, opposite to one another, through the action of the third mechanism, and the two levers rotating in opposite senses when the supports are subjected to the action of the third mechanism.

Referring to the drawing, the device 1 (FIG. 1) according to the invention is described in connection with the application of an elastomeric filler 2 about a tire bead-core 3.

The filler 2 is part of a continuous strip L (FIG. 2) of uncured material, defined by a cross section K having a base 4 and an upper part of pre-established shape, for instance a triangular shape with opposite sides 5, 6.

Figure 2:
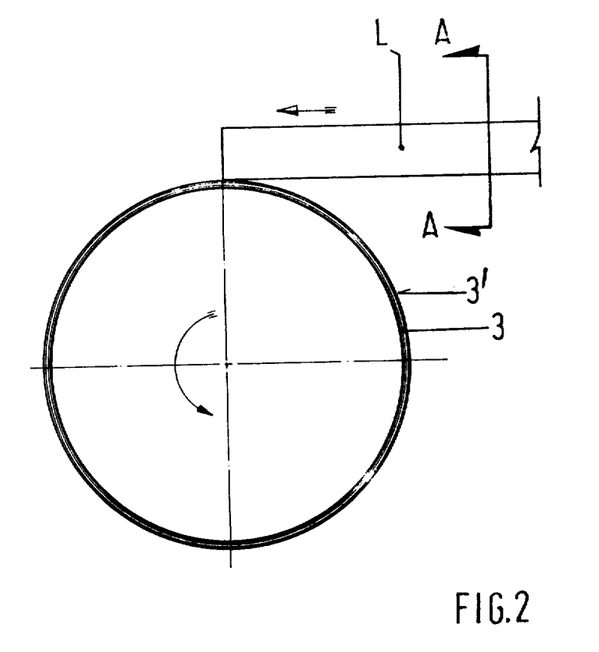
FIG. 2 represents diagrammatically the advancement of a continous strip before its association with the core and shows the cross-section of the elastomeric strip.

The continuous strip L is prepared separately, for instance by means of an extruder, and is progressively collected, together with other strips, in an appropriate loading plane. Subsequently, strip L while maintained in a tacky state, is advanced towards the device 1 and is gradually cut into a plurality of sections, each of which is formed by cutting the strip orthogonal to the strip advancement direction at a length equal to the peripheral layout of the external surface 3' of the core 3.

The device 1 comprises a fixed frame 7, to which are associated two discs 8, 9, whose axes are parallel to the horizontal plane of the floor and whose peripheral zones 10,11 (FIG. 3) are in mutual contact so as to rotate simultaneously under the control of any driving means which can be associated to one disc or to the other.

Figure 3:
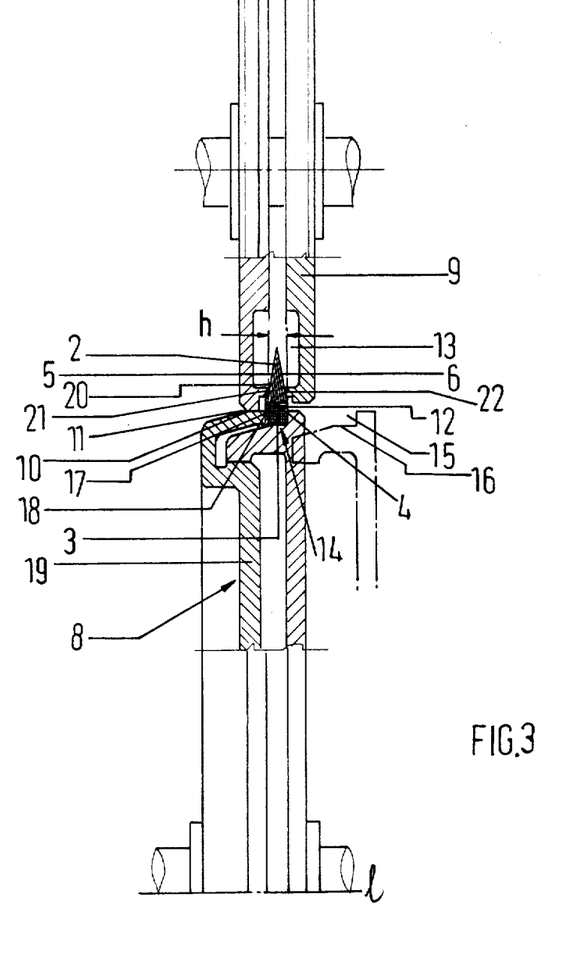
FIG. 3 illustrates in partial cross-section the two discs of the device of FIG. 1.

The first disc 8 comprises an annular groove 12 for encasing the core 3, the second disc 9 comprises a second annular groove 13 within which the upper part of the filler, coming from a suitable conveyor belt (not illustrated) situated upstream of the device 1, slides in a tangential direction.

The core 3 is firmly secured to the first disc 8 by appropriate pinching means 14 (FIG. 3) adapted both to receive the core 3 already prepared with a liquid substance intended to provide the adhesion of the filler not at the extrusion temperature and, after the application of the filler, to unload the core on a collecting chute.

The pinching means are substantially formed (FIG. 3) by an annular seat 15, formed as a step, obtained on the peripheral surface 16 of the first disc and by a surface 17, formed as a circle ring situated on the peripheral zone 18 of a flange 19 coaxial to the first disc.

The flange 19 is associated with the first disc because the circle ring is opposite to the step, so as to originate the annular groove 12 intended to encase the core.

The flange and the first disc are reciprocally displaceable in the direction of the axis 1 of the first disc in order to originate the locking of a core or the unloading of the same core with the relative filler.

The present description and the drawing make reference to a core having a square or rectangular cross-section; however, the invention applies also to cores having other cross-sections, for instance, hexagonal or circular, to which fillers, having a base of corresponding shape to provide a satisfactory adhesion, are to be applied.

In all the above cited cases, the annular seat of the first disc and the flange originate a housing intended to receive the relative core.

Moreover, it is understood that the means adapted to displace and block the first disc and the flange may comprise for instance any oleo-dynamic control of known type, so that, for a greater simplicity of description, these means are not considered in the present specification.

The second disc 9 comprises localized compression means 20 (FIG. 3) acting on the opposite sides 5, 6 of the filler passing through the second annular groove 13.

The localized compression means 20 comprise, inside the second groove 13, two annular edges 21,22 in opposite position and at a distance h, measured parallely to the axis of the second disc, which is smaller than the transverse dimension of the filler passing through them.

The edges have the task of bringing the base 4 of the filler, pushed tangentially to the periphery of the second disc, on the outer surface 3' of the core 3 so as to provide its adhesion to the latter.

In particular, the annular edges 21,22 have knurled surfaces to facilitate the advancement and the application of the filler.

The remaining parts of the device are those necessary for the application and the total covering of the core with the filler base.

The device comprises further means for detaching the two discs from each other, in order to allow an easy removal of the core with the relative filler. These means do not constitute an integral part of the present invention, so only reference is made here to the fact that the second disc 9 can be moved away from the first disc, by maintaining its axis parallel to the horizontal plane, with the aid of any lifting apparatus able to cause the sliding of the two ends of the shaft into suitable grooves (not shown) of the frame. In this way, it is then possible to detach the flange 19 from the annular seat 15 of the first disc and to unload the core with the filler.

The device 1 comprises additional parts, substantial for the purposes of the invention, which are consequently provided to join the facing ends of the filler strip whose base covers the core completely.

In fact, the faces are spaced from each other as a "V", since the length of the upper part of the filler is equal to its base length, in consequence of the cutting of the strip L carried out orthogonally to its advancement direction.

The additional substantial parts comprise means 23 (FIG. 1) for blocking the opposite sides of the filler in proximity of each end 24,25 of the "V", and means 26 for butt-splicing the ends 24,25.

Figure 1:
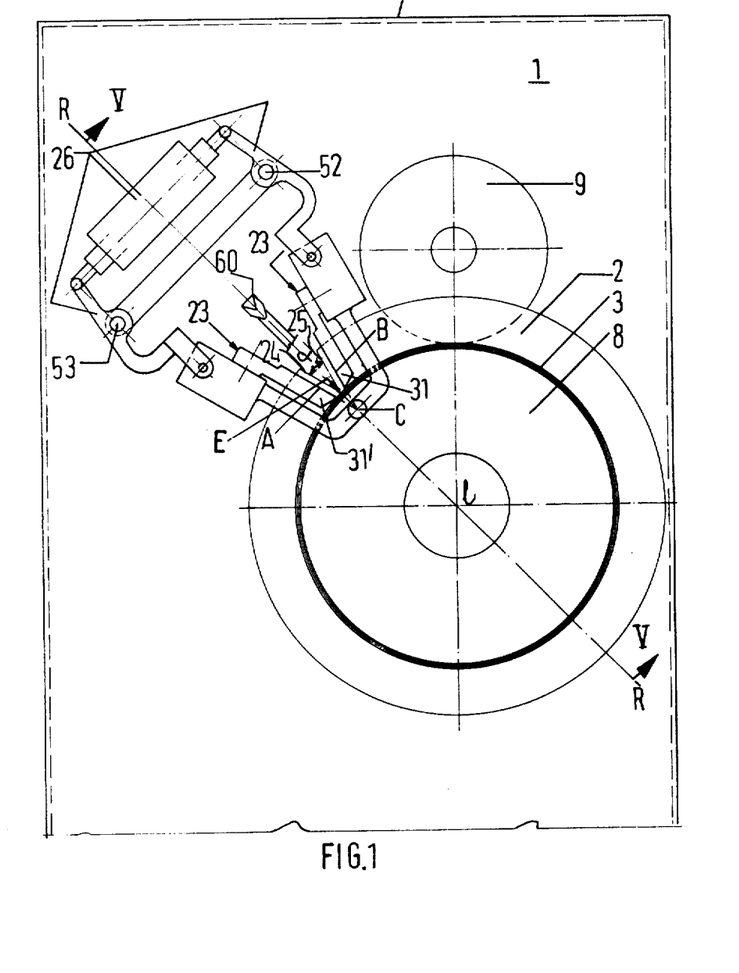
FIG. 1 is a side view of one embodiment of the apparatus provided by the invention.

The blocking means 23 comprise two pairs of pressure elements, each acting on only one part of the opposite sides of the filler in proximity of an end of the "V" and two relative mechanisms, first and second, for imparting opposite thrusts in each pair.

The butt-splicing means 26 comprise at least a third mechanism 26' (FIG. 4) for imparting opposite thrusts on the two pairs of pressure elements acting on the filler.

The pressure elements in one pair, preferably two arms 30, 31 (FIG. 5) are arrnged symmetrically with each other with respect to the center plane X—X of the filler and at a preestablished distance from the filler when the first disc, with the core 3, is rotating.

Figure 5:
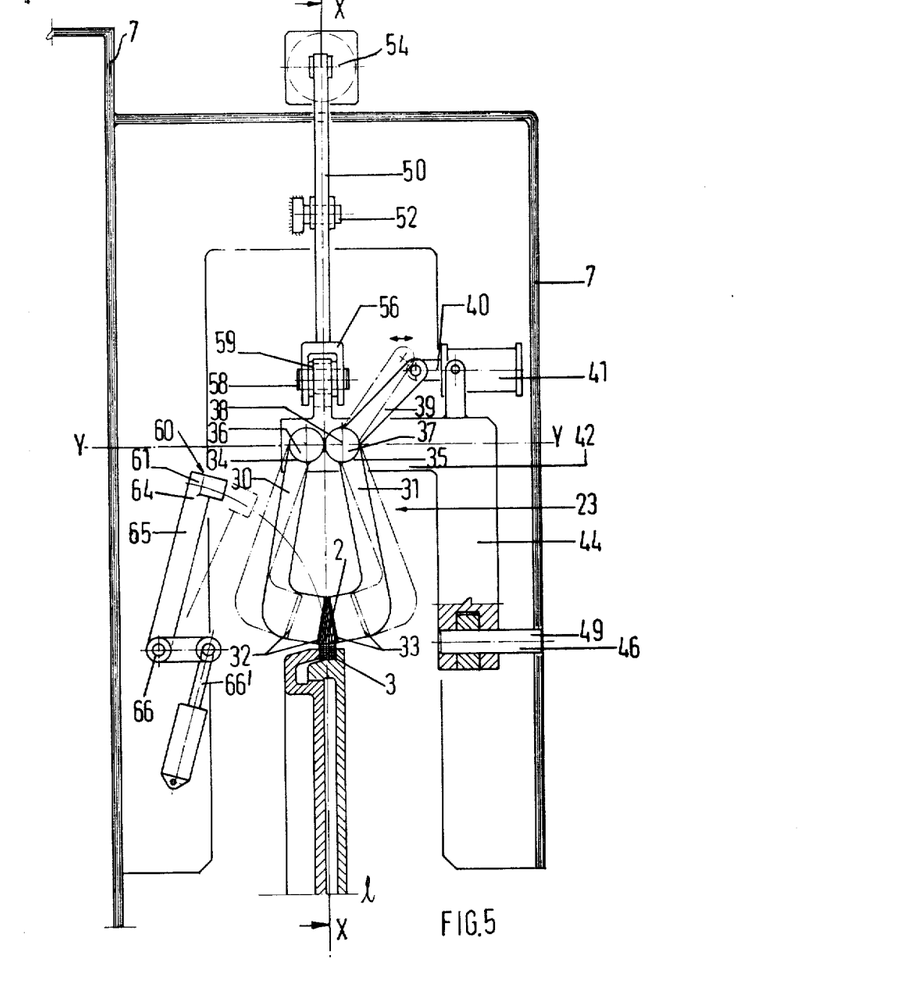
FIG. 5 represents diagrammatically the blocking and connecting means acting on the filler along plane V—V of FIG. 1.

The two arms 30,31 comprise respectively two surfaces 32, 33 which exert pressure on the elastomeric material and first ends 34,35 associated to a first and a second sprocket wheel 36, 37 meshing together, symmetrical with respect to the center plane X—X of the filler and having axes parallel to each other, lying in a single plane Y—Y perpendicular to the center plane X—X.

The second sprocket wheel 37 has is own revolving shaft 38 connected to a ledger 39 associated with a piston 40 slidable into a fluid-dynamic cylinder 41, forming part of the first mechanism for applying opposite thrusts on the two arms 30,31. The fluid-dynamic cylinder 41 is externally connected to the third mechanism 26' of the connecting means 26, as will be more clearly explained hereinafter.

Preferably, the arms 31,31' of the two pairs, on the same side of the filler (FIG. 1) form with each other an angle α, equal to the angle defined by the ends of the "V" of the filler, and the prolongations A and B of said arms meet at a point C nearer to the axis of the first disc than the point where the vertex E of the "V" of the filler lies on the core.

In particular, position C is such that an amount of elastomeric material which, measured circumferentially, is at least equal to 0.5 mm is left between the ends 24 and 25 of the "V" and the position of the arms.

This solution is the most advisable to allow good compression and sealing of the uncured elastomeric material between the opposite ends 24,25 of the "V" of the filler, approached together by means of the third mechanism 26'.

With reference to the above cited preferred device 1 (FIG. 5) the two arms 30,31 and the fluid-dynamic cylinder 41 of a pair are integral to a support 42 (FIGS. 4,5) having for instance a parallelpiped shape or the like, which is on its turn rigidly connected (FIG. 4) to the first end 43 of a lever 44, the second end 45 of which is rotating about a pivot 46 whose axis of rotation is parallel to the axis of the first disc.

Likewise, the second pair has arms and cylinder for the application of opposite thrusts on the arms integral to a second support 47 (FIG. 4) connected to a second lever 48 rotating about the same pivot 46 of the first lever 44. The pivot 46, about which rotate the two levers, is arranged with its end 49 secured to the fixed frame 7 (FIG. 5).

Figure 4:
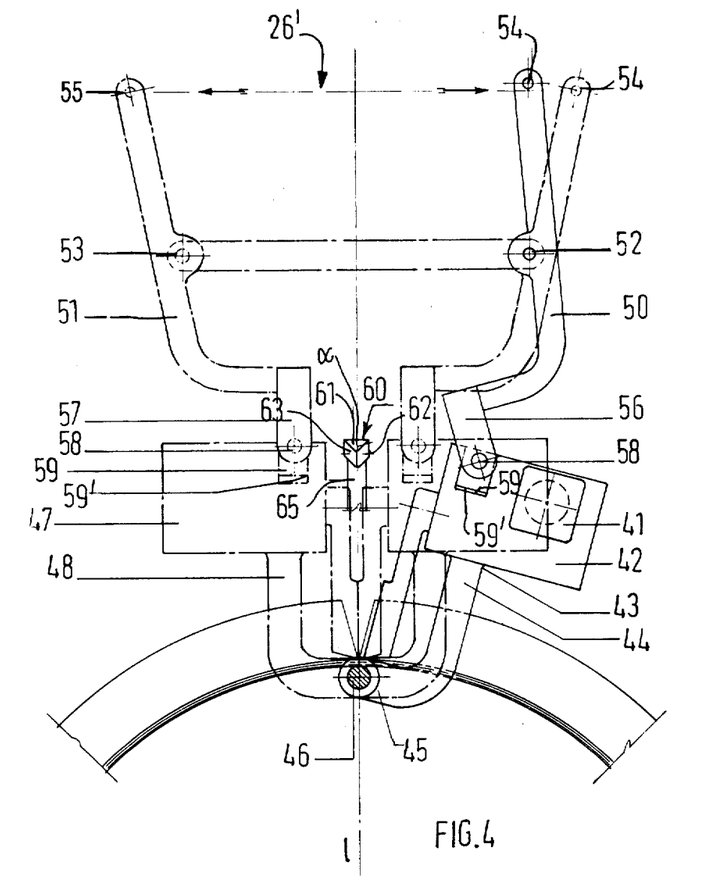
FIG. 4 represents diagrammatically in dashed line a means for blocking the facing open ends of the filler on the core and a means for butt-splicing the ends when they are joined; the same Figure represents in continuous line the means in proximity of only one end of the filler before the joining of the two ends of the latter.

The two supports 42 and 47 are moreover connected to the means 26 for butt-splicing the filler 2 in various ways, so that, when the arms of each pair are acting on the elastomeric filler, the mutual approach of the supports 42,47 by virtue of the third mechanism 26' originates the mutual approach of the facing ends 24,25 of the "V" of the filler.

The preferred embodiment of the device 1 comprises two additional third and fourth levers 50,51 whose fulcrums 52,53 are pivotally fixed to the frame, whose axes of rotation are parallel to the axis of the first disc, whose first ends 54,55 are hinged to the third mechanism 26' substantially comprising a fluid-dynamic control, and with second ends 56,57 provided with pins 58 (FIGS. 4,5) slidable into suitable grooves 59 of the two supports. The pins 58 are preferably associated with sliding blocks 59' (FIG. 4).

The above indicated preferred embodiment permits facing "V" shaped ends of the filler to approach each other since the pins 58, on which levers 50,51 rotate from the position indicated in FIG. 4 with a continuous line to that indicated with a dashed line, exert through the sliding blocks 59' a thrust on the walls of the grooves 59 of the two supports 42,47 in which they slide, displacing therefore the relative arms integrally associated to said supports and already acting on the sides 5,6 of the filler.

The device 1 further comprises adjusting and centering means 60 (FIG. 1) provided between the "V" of the filler on the first disc and the blocking and butt-splicing means which have the task of allowing the joining of the "V" shaped facing ends only when the amount of elastomeric material from the arms of each pair to the extreme edges 24,25 of the filler is the desired one, namely, in the preferred embodiment, an amount of at least 0.5 mm.

In particular, the means 60 (FIG. 4) comprises a body 61 of substantially geometrical form, having at least two lateral faces 62,63 forming a 'V' (namely an angle α) corresponding to the "V" originated by the opposite ends 24,25 of the filler on the core.

Body 61 is integrally secured to the end 64 of a lever 65 hinged at the opposite end 66; lever 65 can rotate about the hinge, by means of a lever system actuated by a piston 66', as clearly indicated in FIG. 5. Consequently, body 61 can be inserted with the relative faces 62,63 between the "V" of the filler on the core according to methods and modalities which will be explained hereinafter.

The operation of the device is as follows:

At first the device is prepared for receiving a core 3 of a pneumatic tire, namely the first disc 8 and the flange 19 are mutually spaced, as shown from the dash concerning disc 8 in FIG. 3.

Immediately afterwards, the core 3, already coated with the adhesive substance, is inserted in the annular seat 15 of the first disc 8 and the disc 8 and the flange 19 are mutually approached along the direction of axis 1 until the core 3 is well blocked between the circle ring 17 of the flange 19 and the annular seat 15 of the first disc.

Now the core 3 is ready to receive about its external surface 3' the filler 2 and the operation is continued by causing the rotation of the disc 8 which, through its peripheral zone 10, pulls into rotation the second disc 9 by contact on the peripheral zone 11 of the latter.

A further step originates the formation of the filler; this is obtained by a strip L (FIG. 2) subjected to mechanical thrusts in a direction tangential to the rotating core 3.

During this step two successive cuts are carried out in a direction orthogonal to the strip advancement direction by automatically adjusting the space between the two cuts so as to obtain a section of elastomeric material having a length equal to the length of the outer surface 3' of the core 3.

The filler strip is already manufactured by an extruder situated in proximity of the device or in another zone.

Therefore, when the device is working, the various strips to be used, in uncured state and at room temperature, are placed in a position convenient for their use and are time by time taken up from the collecting plane and conveyed to the cutting station. The equipment provided to feed the device according to the invention with the filler strips can be manual or automatic and its structure may range from the simplest to the most sophisticated.

Consequently, the extruder and the equipment used to feed and to collect the strips are not illustrated in the present specification, since they are conventional and are not included in the scope of the invention.

During the above cited step, the filler passes through the walls of the annular groove 13 of the second disc 9 and, by the action of the annular edges 21, 22 it is applied on the core all around the outer surface of the latter. This operation can be advantageously carried out with perfect regularity and continuity. In fact, the annular edges, having a mutual distance h (FIG. 3) which is smaller than the original cross-section of the filler, exert a thrust on both opposite sides of the filler, compelling the elastomeric material to be deformed in the portions underlying the edges.

In particular, the base 4 of the filler would tend to take a convex shape towards the outside of the annular groove 13 but, as the flowing of uncured elastomeric material is contrasted by the presence of the outer surface 3' of the core 3, the base is pressed with considerable force on the outer surface 3' of the core 3, already coated with the liquid adhesive substance.

In consequence of the above, the application of the filler on the core is carried out in a quite reliable manner.

This result depends in particular upon the fact that only the annular edges and not the whole wall of the annular groove 13 are in contact with the filler strip.

In that case, the action of the annular edges takes place only on circumferential lines and not on large contact surfaces of the opposite sides of the filler. Therefore, a possible pulling of the filler section, due to high friction, on the second rotating disc 9 instead of its application on the surface 3' of the core rotating on disc 8 is advantageously excluded. At the end of the cited step, the filler base 4 covers completely the surface 3' of the core 3 and the upper part of the filler has ends 24,25 opened to form a "V", as clearly visible in FIG. 1.

Subsequently, the additional steps to butt-splice the filler ends are carried out as follows.

The disc 8 is at first stopped in such a position that the two facing ends of the filler have a relative axial plane of symmetry near the symmetry plane R-R of the two pairs of blocking means 23 (FIG. 1).

In this condition, the disc 8 is in idle position so that its rotation may originate the displacement of the two facing ends 24,25 of the filler in such a position that their plane of symmetry is exactly coincident with the cited plane of symmetry R—R of the blocking means 23.

This alignment operation is carried out through the adjusting and centering means 60 (FIG. 1) by operating the control unit 66' (FIG. 5) of the body 61, whose lever 65 is caused to rotate about fulcrum 66 on the fixed frame until the lateral faces 62,63 (FIG. 4) are brought beteen the facing ends of the "V" of the filler.

During the movement of the body 61, at least one of the faces 62 and 63 slides in contact with one of the ends 24 or 25 of the filler, moving consequently the idle disc 8 until both faces 62,63 of the solid body 61 are exactly inserted and centered between the "V" of the filler.

When this operation is over, the two facing ends of the filler have the relative plane of symmetry which is coincident with the plane of symmetry R—R (FIG. 1) of the blocking means 23.

This operation is fundamental to insure a perfect butt-splicing of the filler ends, since an equal amount of elastomeric material is previously provided in proximity of each end of the "V" of the filler. In this way the blocking means 23 and the butt-splicing means, as will be explained hereinafter, bring into mutual contact the required amounts of elastomeric material to splice them, in view of a good compression and of a consequent perfect joining.

From now on, the further steps for effecting the splicing are carried out. The immediately successive step is the application of the blocking means 23 on each end 24,25 of the filler.

During this step, a fluid under pressure is sent inside the fluid-dynamic cylinder 41 (FIG. 5) to move the relative piston 40 towards the right of FIG. 5.

Consequently, the ledger 39 is moved from the position shown in dashed line in FIG. 5 to that indicated in continuous line, originating the rotation of the sprocket wheels 36 and 37 and therefore the rotation of the arms 30 and 31 from the rest position (dashed line) to the position of action (continuous line) on the opposite sides of the device in proximity of one end of the "V" of the filler.

Owing to the opposite thrusts exerted on the surfaces 32 and 33 of the arms 30 and 31, the filler is firmly blocked to one of the two pairs of the pressure elements connected to the fixed frame.

Likewise, the second pair of pressure elements is caused to act on the opposite sides of the filler in proximity of the second end 24 of the "V" (FIG. 1).

After this phase, both for the particular geometry of the blocking means 23, namely the angle α formed by parallelograms A and B of the two arms 31, 31' of the two pairs on the same side of the filler (FIG. 1), and for the centering action exerted by the solid body 61, an equal amount of uncured elastomeric material is blocked between the free edges of the two ends of the "V" of the filler and the two arms.

This pre-established amount of elastomeric material, equal for the whole height of the filler, is preferably at least 0.5 mm.

After having so provided the optimum conditions for the formation of the splice, the solid body 61 is moved away from the ends 24, 25 of the filler as far as it reaches the rest position shown in continuous line in FIG. 5. Then a successive phase is immediately carried out to actuate the means for butt-splicing the two facing ends 24,25 of the "V" of the filler.

During this phase, the third mechanism 26' is controlled (FIG. 4) by applying the opposite thrusts of equal intensity on the third and fourth levers 50,51 in such a way that the levers, rotating about fulcrums 52 and 53, pass from the rest position indicated in continuous line to the position shown in dashed line in FIG. 4.

The rotation of the levers originates the sliding of the pins 58, applied to the second ends 56,57, in the grooves 59 of the supports 42,47 to which the blocking means 23 are integral, namely the arms of the pairs of the pressure elements acting on the opposite sides of the filler.

In accordance with what is said above, the displacement of the cited supports determines the rotation of the levers 44 and 48 about the common pivot 46 and therefore the approach, and the subsequent butt-splicing, of the facing ends of the "V" of the filler.

After this phase, the two facing ends 24,25 of the filler, which are made of an elastomeric material in tacky condition and are subjected to the above described compression become perfectly joined together, so that the filler is completely applied, with an annular distribution, on the core 3.

Then the arms are moved away from the opposite sides of the filler and the rest condition of the connection means 26 is restored.

In these steps, the actuations are opposite to those indicated above, i.e. the first and second mechanism are operated in such a way as to bring, for instance, the arms 30 and 31 in the position indicated in dashed line in FIG. 5 and approach thrusts are applied to the ends 54 and 55 of the third and fourth lever 50,51.

In a final step, the core carrying the filler is unloaded. During this step, the two discs are at first detached, and then the flange 19 is moved away from the disc 8 (FIG. 3) so as to pick up the core with the filler from the annular seat 15 and to prepare the loading of a new core.

Then the new core is disposed inside the annular seat 15 and the discs 8 and 9 are arranged with their periphery in mutual contact, as shown in FIG. 1, the movement of the strip L in a direction tangent to the surface 3' of the core is started again and the filler is formed, with a length determined by two cuts orthogonal to the advancing direction of the strip L (FIG. 2) which corresponds to the peripheral layout of the core.

Subsequently, the movement of the strip L is stopped and a new filler is applied on the core according to the above indicated detailed explanations.

It is evident that all the above mentioned working steps can be advantageously effected from the beginning to the end without down-times, excluding the employment of labor and with efficient automation.

In fact, the features of the device are such that the core 3 can be at first inserted (by means of any apparatus, not described, because not making part of the present invention) between the disc 8 and the flange 19 and then, by virtue of its perfect clamping in the annular groove 15, it may receive at the utmost speed the filler section obtained by means of two cuts orthogonal to the advancement direction of the strip L (FIG. 2).

Subsequently, after having covered the core with the filler whose ends 24, 25 are spaced from each other, the disc 8 can be stopped even if the alignment between the plane of symmetry of the filler ends and the plane of symmetry R—R of the blocking means 23 is not quite regular.

This feature permits on one hand to carry out with the maximum possible rapidity and safety the further steps for butt-splicing the two ends 24,25 of the filler and, on the other hand, it prevents the use of complicated electronic and mechanical apparatuses which would be otherwise necessary to obtain in all cases the immediate alignment of the ends 24,25 of the "V" of the filler with the plane R-R as soon as disc 8 is stopped.

The cited characteristics of the device therefore make it possible to obtain a large high quality output.

A further advantage of the invention is given by the possibility of making the butt-splicing of the two ends 24,25 of the filler dependent on only one automation acting on the third mechanism 27'. In fact, as described above, the presence of the levers 50,51 and 44,48 (FIG. 4) make it possible to impart simultaneously the drive to the blocking means 23 already acting on the device, and consequently to carry out the desired joining.

Moreover, although the present invention has been described with reference to a particularly advantageous embodiment, it is to be taken into account that it includes in its scope any other alternative embodiment which a technician of this field can deduce from the above indicated inventive principles.

For instance, a different embodiment of the first disc can be foreseen, substantially based on a different way of inserting the core 3 in its respective groove, or provide for instance a drive of the blocking means 23 different from that described.

In particular, the two pairs of pressure elements acting on the opposite sides of the filler may be moved towards each other by independent driving systems or else to approach the two ends 24,25 of the filler towards the plane of symmetry R—R in successive times, namely at first the end 24 and then the end 25.

Moreover, the working sequence of the device may be modified without departing from the scope of the invention.

For instance, it is possible to remove the solid body 61 from the two ends 24,25 of the filler before applying the arms (30,31 in FIG. 5) on the opposite sides of the filler. In that case, the disc 8 can be blocked in the space by an appropriate brake/clutch unit until the arms are acting on the filler.

It is also evident that the above mentioned inventive concepts apply equally well to the joining of fillers to cores of pneumatic tires of various types, for instance auto tires, having fillers with a height of up to 40 mm, or can also be used in other fields. Moreover, it can be understood that the two cuts on the filler strip can be effected in any way similar to that described above, provided that the extreme facing surfaces of the filler are opened with respect to each other and have their lower vertex on the relative core, and the two surfaces match each other when they are approached and compressed by the means provided by the invention.

It will also be understood that the different steps of loading the core, applying the filler on the core, butt-splicing the opposite "V"-shaped ends of the filler can be effected in one or more stations or positions.

For example, the loading of the core and the application of the filler on the core can be effected in subsequent stations.

For instance, the blocking and butt-splicing means indicated in the description can all be disposed in one station, at which the core arrives together with the filler comprising the "V"-shaped ends already oriented in a suitable way with respect to the means in order to achieve reliable welding conditions previously described in the test.

The first disc can reach this further station in various manners by means of rectilinear advancements or by rotation around a center for all the possible stations.

Then, the loading of the core can take place in a different station from the one wherein the application of the filler on the core happens and, in the same way, also the unloading of the core with the filler can be effected either in the same station of butt-splicing the "V"-shaped ends of the filler or in another subsequent station.

These modifications have the advantage of increasing the productivity, because different operations for many components can be effected in various stations at the same time.

Moreover, the presence of one or more stations allows easier access to the device for regulations or eventual maintenances, for example, also for a change of the tooling due to core-filler assemblies of different sizes.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. An automatic device for the continuous application of elastomeric fillers on bead cores of pneumatic tires, each filler comprising a base and an upper part of pre-established shape, said filler having a length equal to the outermost peripheral layout of the bead core, said device comprising a fixed frame to which are associated two discs in mutual contact along their periphery in order to rotate simultaneously, the first disc comprising a first annular groove to encase the bead core, the second disc comprising a second annular groove into which the upper part of the filler slides in a tangential direction, said second annular groove being able to dispose the base of the filler on the bead core rotating with the first disc as long as the filler base covers the outermost peripheral layout of the bead core and the two facing ends of the upper part of the filler are opened in the form of a "V", said device being characterized in that it comprises two pairs of two pressure elements each, each pair of pressure elements comprising two arms arranged symmetrically to each other with respect to the center plains of the first annular groove of the first disc and rotating around the axis of rotation at one end by means of at least one associated piston of a fluid-dynamic cylinder forming part of a mechanism for imparting thrusts opposite to one another in a pair of two arms, a butt splicing means for the facing ends of the filler, said fluid-dynamic cylinder being externally connected to said butt splicing means whereby when the fluid dynamic-cylinder applies the said opposite thrusts the said arms block the filler to the butt splicing means, said butt splicing means applying thrusts opposite to one another on the two pair of arms, and adjusting and centering means for orientating the first disc comprising the filler in respect of the position of the central symmetrical plane of the two pair of pressure elements, said means comprising a body of geometrical form having at least two lateral faces forming a "V", said body being actuated by a suitable control unit which moves said body between the two facing ends of the filler.

2. The device of claim 1 characterized in that said two arms comprise ends associated with first and with second sprocket wheels which mesh together and are symmetrical with respect to said center plane, at least one of said sprocket wheels comprising a revolving shaft connected with a ledger associated to said piston of the fluid dynamic cylinder.

3. The device of claim 1 characterized in that said body forming a "V" is connected by means of a lever to the frame.

4. The device of claim 1 or 2, characterized in that each pair of the pressure elements, with the piston and the fluid-dynamic cylinder, is integral with a support secured to the first end of a suitable lever whose second end is fastened to a pivot whose axis of rotation is parallel to the axis of the first disc, said pivot representing the common axis or rotation of said levers to which are associated the two supports with the two pairs of pressure elements, said pivot being moreover secured to the fixed frame, said two supports being subjected to thrusts, opposite to one another, through the action of said butt-splicing means.

5. The device as in claim 4, characterized in that the means for butt-splicing the facing ends of the filler comprise two additional third and fourth levers situated with their fulcrums applied to the frame along axes of rotation parallel to the axis of the first disc and in symmetrical position with respect to the plane, radial to the first disc, constituting a plane of symmetry between the two pairs of the pressure elements, the first ends of the third and fourth levers being associated to a fluid-dynamic control, the second ends of said third and fourth levers comprising pins slidable into appropriate grooves of the two supports when said fluid-dynamic control exerts oppositely directed thrusts to rotate said third and fourth levers in opposite directions.

6. The device of claim 1 characterized in that the two arms of the two pairs of elements arranged on the same side of the filler are inclined with respect to each other to form an angle equal to that originated by the facing ends of the filler in the form of a "V", and the two arms are inclined with respect to each other and have extension members which meet at a point nearer to the axis of the first disc than the point occupied by the vertex of the "V" of the filler lying on the core.

7. The device of claim 6 characterized in that the amount of elastomeric material between the "V"-shaped ends of the filler and the two inclined arms, measured circumferentially, is at least equal to 0.5 mm.

8. The device of claim 1 characterized in that it comprises means for pinching the core on the first disc.

9. The device of claim 8 characterized in that said pinching means comprise an annular seat, formed as a step disposed on the peripheral surface of the first disc and a surface, formed as a rim, situated on the peripheral zone of a flange coaxial to the first disc, said flange being associated with the first disc, with said ring opposite to said step to originate said annular seat, said flange and said disc being relatively movable in the direction of the axis of the first disc to load or unload said core.

10. The device of claim 1 characterized in that it comprises localized compression means, acting on the sides of the filler passing through the second annular groove of the second disc in a direction tangential to the bead core associated to the first disc.

11. The device of claim 10 characterized in that said localized compression means comprises, inside said second groove, two opposite annular edges whose mutual distance, measured parallel to the axis of the second disc, is smaller than the transverse direction of the filler passing through them.

12. The device of claim 11 characterized in that said edges are provided with knurled surfaces.

13. The device of claim 1 characterized in that the said adjusting and centering means for orienting the first disc comprising the filler in respect of the position of the two pair of pressure elements are disposed in a first station, the said two pair of pressure elements and the said butt-splicing means are disposed in a second station, means of rotation around the center being provided to rotate the first disc from the first to the second station.

14. The device of claim 13 characterized in that it comprises a further third station subsequent to the second station for the unloading of the filler with the bead core.

15. An automatic device for the continuous application of an elastomeric filler on a bead core of a pneumatic tire, each filler comprising a base and an upper part of pre-estabilished shape, said filler having a length equal to the outermost peripheral layout of the core, said device comprising a fixed frame to which are associated two discs in mutual contact along their periphery in order to rotate simultaneously, the first disc comprising a first annular groove to encase the core, the second disc comprising a second annular groove into which the upper part of the filler slides in tangential direction, said second annular groove being adapted to apply the base of the filler on the bead core rotating with the first disc as long as the filler base covers the outermost peripheral layout of the bead core and the two facing ends of the upper part of the filler are opened in the form of a "V" said device being characterized in that it comprises two pairs of two pressure elements, each pair of pressure elements comprising two arms arranged symmetrical to each other with respect to the center plane of the first annular groove of the first disc and rotating around the axis of rotation at one end by means of at least one associated piston of a fluid-dynamic cylinder forming part of a mechanism for imparting thrusts opposite to one another in a pair of two arms, said fluid-dynamic cylinder being externally connected to butt splicing means for the facing ends of the filler whereby when the fluid dynamic cylinder applies the said opposite thrusts the said arms lock the filler to the butt-splicing means, said butt-splicing means applying thrust opposite to one another on the two pair of arms, adjusting and centering means for orienting the first disc comprising the filler in respect of the position of the central symmetrical plane of the two pair of pressure elements, said means comprising a body of geometrical form having at least two lateral faces forming a "V", said body being actuated by a suitable control unit which moves said body between the two facing ends of the filler, and localized compression means, acting on the sides of the filler passing through the second annular groove of the second disc in a direction tangential to the core associated with the first disc, said localized compression means comprising inside the second groove of the second disc, two opposite annular edges whose mutual distance, measured parallel to the axis of the second disc is smaller than the transverse direction of the filler passing through them.

* * * * *